United States Patent [19]

Truong et al.

[11] Patent Number: 5,271,070

[45] Date of Patent: Dec. 14, 1993

[54] MULTI-DIMENSIONAL ERROR DIFFUSION TECHNIQUE

[75] Inventors: Thanh D. Truong, Walnut; Vinod Kadakia, Rancho Palos Verdes, both of Calif.

[73] Assignee: Xerox Corporation, Stamford, Conn.

[21] Appl. No.: 972,403

[22] Filed: Nov. 6, 1992

[51] Int. Cl.⁵ .............................................. G06K 9/36
[52] U.S. Cl. ...................................... 382/50; 358/465; 358/466; 382/54
[58] Field of Search ........................... 382/50, 52, 54; 358/465, 466, 455, 448, 464, 451

[56] References Cited

U.S. PATENT DOCUMENTS

| | | | |
|---|---|---|---|
| 5,121,446 | 6/1992 | Yamada et al. | 382/50 |
| 5,121,447 | 6/1992 | Tanioka et al. | 382/52 |
| 5,150,429 | 9/1992 | Miller et al. | 358/466 |
| 5,153,925 | 10/1992 | Tanioka et al. | 382/50 |
| 5,157,741 | 10/1992 | Katayama | 382/54 |

Primary Examiner—Joseph Mancuso
Attorney, Agent, or Firm—Robert E. Cunha

[57] ABSTRACT

A circuit for increasing the speed of conversion of image pixels from one number of bits to another by processing a plurality of pixels in parallel. The conversion of each pixel typically results in a new value and an error term which is divided up among adjacent pixels. By using a plurality of separate conversion circuits, one for each line, and by processing the xth pixel on one line in parallel with the x-2 pixel on the next line, the plurality of pixels can be processed in parallel. All circuits are identical except that the first circuit must get the error term of the line above it from memory, and the last of the parallel circuits must store in memory the error term for the next plurality of lines.

1 Claim, 4 Drawing Sheets

MULTI-DIMENSIONAL ERROR DIFFUSION TECHNIQUE

BACKGROUND OF THE INVENTION

This is a circuit for using error diffusion to convert gray scale pixels into binary or halftone dots, and more specifically describes a circuit for using error diffusion in a plurality of parallel circuits to increase the throughput.

Whenever there is a conversion of gray scale pixels from one number of bits to another, or the conversion from gray scale to halftone, the conversion of each pixel typically results in the new pixel value and a residual error term. This error term can either be discarded, in which case valuable data is lost, or the error term can be added to other pixels prior to their conversion step. Ideally, the error term should be added to all of the surrounding pixels, although in actual practice, all of the pixels are not available. For example, the error term can not be added to the previous pixel on the same line, or to the pixels on the line above, or to any other pixel that has already been converted. Thus, the error term can be added only to the next pixel on the same line, and the three adjacent pixels on the next line.

Since the error term must be split among four pixels, some ratio of apportionment must be predetermined. One known set of ratios is 7/16 of the error added to the value of the next pixel, and 3/16, 5/16 and 1/16 added to the three adjacent pixels on the next line, from left to right, as shown in FIG. 5. On each line, the process is to convert the current pixel during one cycle time to produce an output pixel and one error term which can be used to process the next pixel in the same line and three error terms for the next line, Although the term for the next pixel on the same line can be used immediately, the three terms for the next line must be stored in memory until the next line is converted. The resultant line-by-line processing, including memory reads and stores, is a time consuming process.

SUMMARY OF THE INVENTION

This invention describes a circuit which can be used to process two or more lines of pixels in parallel, therefore speeding up the process. The concept which enables this parallel processing is that of allowing the processing of the current line to get two pixels ahead of the next line. Thus, for example, in the first line, pixel number 6 is being processed at the same time as pixel number 4 in the second line, pixel number 2 in the third line, etc. In this way, by delaying the error terms the proper amount, all of the error terms are available for each pixel at the time it is being processed, and any number of lines can be processed in parallel. The exceptions are the first line of the set, which must get its error terms from memory, and the last line which must store into memory its output error terms for the next line.

DETAILED DESCRIPTION OF THE INVENTION

Figure 1:
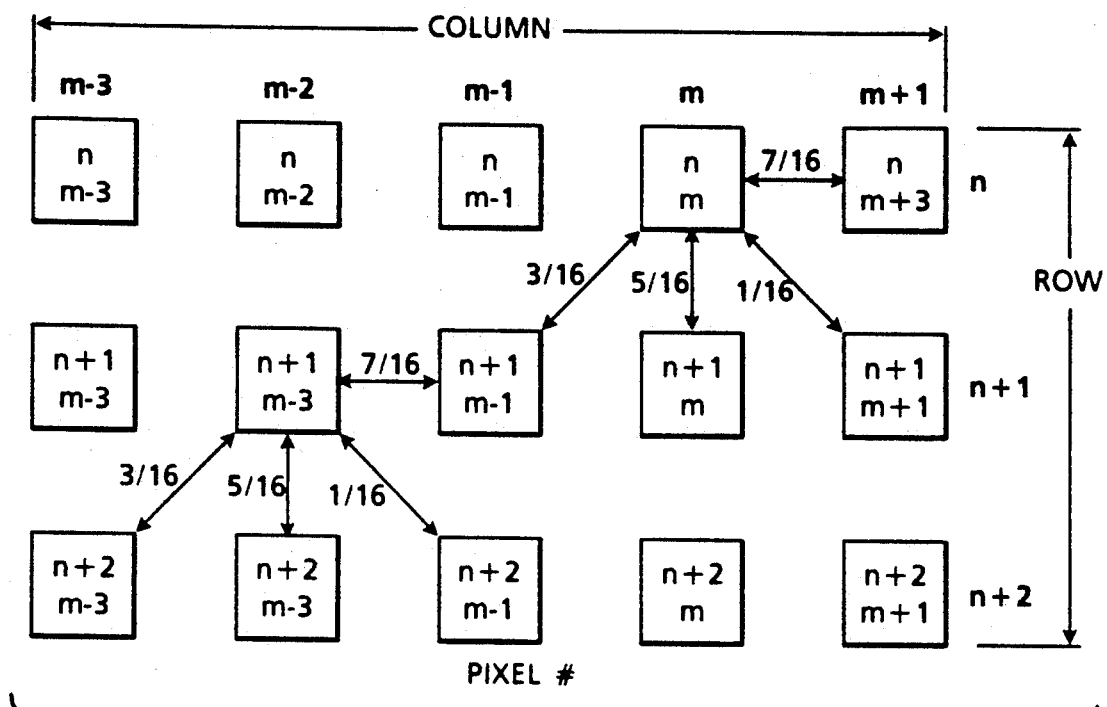
FIG. 1 shows the arrangement of the pixels that are processed in parallel.
Figure 5:
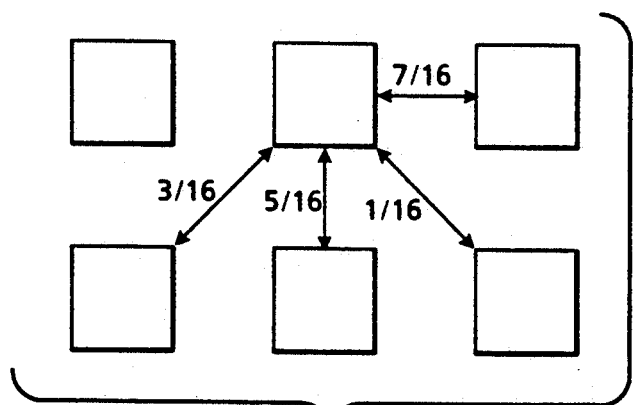
FIG. 5 is a diagram of the prior art weighting values.

FIG. 1 shows a numerical example of the overall operation of the invention which processes two lines at a time. The rows are numbered from n to n+2 and the columns are numbered from m−3 to m+1. One computation cycle for pixel n,m adds the error remainders that it has previously received from other pixels to its original value and computes a new pixel value and an error term. The error term is then distributed in fractional amounts as shown to the next pixel on the same line, pixel [n, m+1], and the three adjacent pixels on the next line, pixels [n+1, m−1], [n+1, m], and [n+1, m+1]. At the same time, at pixel [n+1, m−2] the same calculation is being made. As shown here, two pixels are being processed in parallel, speeding up the process by a factor of two. Clearly, there is a hardware vs speed trade-off, the more parallel processors are provided, the faster the entire image can be converted.

Figure 2:
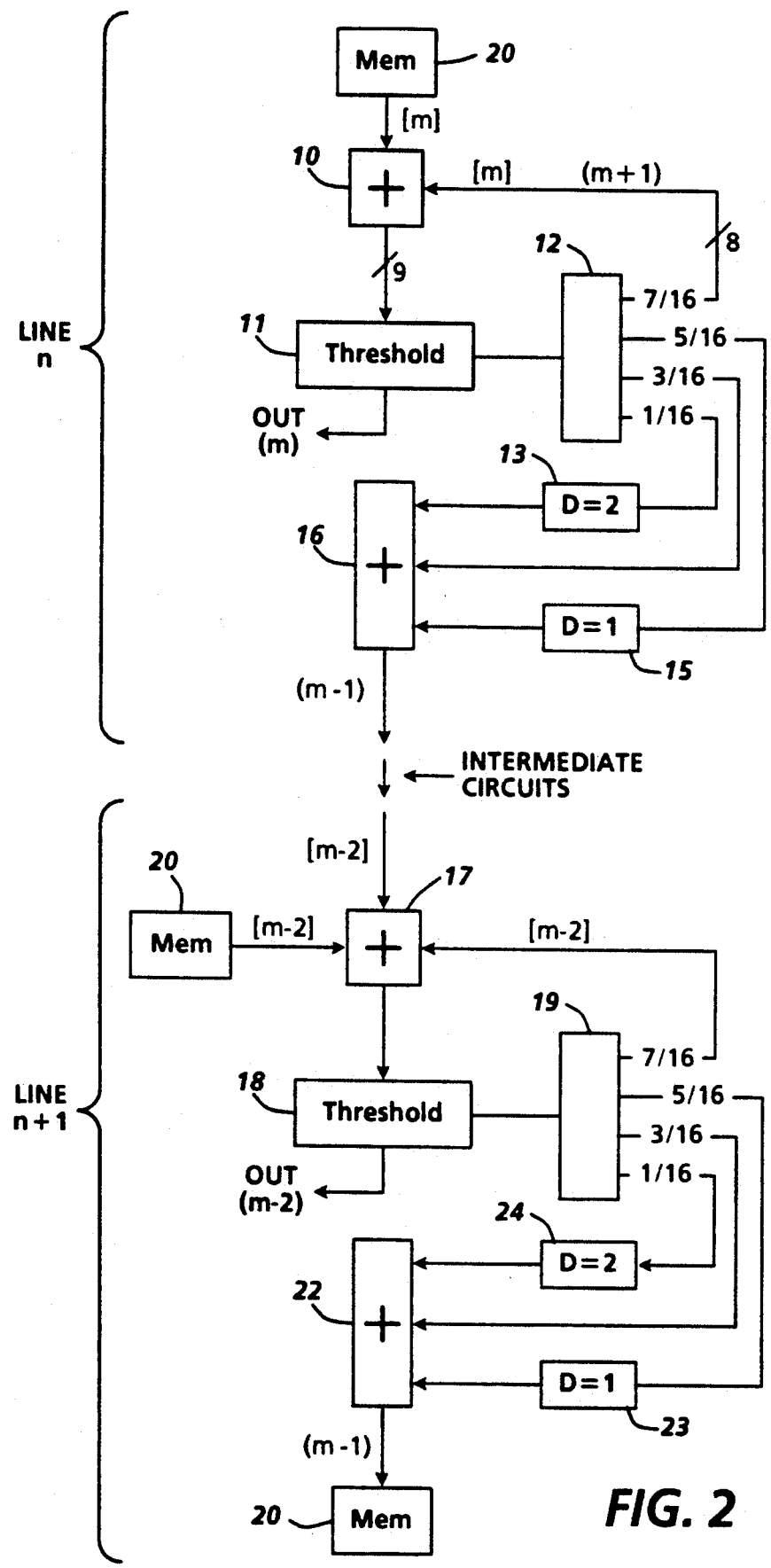
FIG. 2 is a simplified block diagram of two parallel circuits.

FIG. 2 is a simplified diagram of the two processor circuits required to convert lines n and and n+1 of FIG. 2, assuming eight bits per input pixel. Of course, eight bits is only an example, any number of bits per pixels can be used. Also, in this figure, only two circuits are shown, the uppermost and the lowest. Any number of intermediate circuits could be inserted between these two to increase the overall system speed. In all cases, each circuit must get its input pixel from memory, but the combined input error term is received directly from the circuit above and the output combined error term is supplied directly to the circuit below.

This diagram assumes that at some previous time, line n−1 of the image had been processed, and that the remainder terms required by line n are stored in memory 20. The timing of the signals on the various lines at the beginning of the cycle are indicated in brackets, and the signals on the same lines at the end of the cycle (the beginning of the next cycle) are indicated in parentheses. Also, if the signal is indicated as [m], it can be assumed that it will be (m+1) at the end of the current cycle and therefore, at the beginning of the next cycle.

To process pixel m of line n, as shown in the upper half of FIG. 2, the adder 10 takes in from register 12 the 7/16 error value for pixel [m] which was computed from the previous pixel, and the total of the 1/16, 3/16 and 5/16 error inputs and the eight bit current pixel from memory 20, and produces therefrom a nine bit output. From this is subtracted the threshold value in the thresholder 11 to produce the binary output (m). This can be a simple subtraction, with the output bit being the sign bit after the subtraction, for example. At the same time, through a system of shifting and adding, the four error terms are produced at the output of calculator 12.

The 7/16 term is applied to the adder 10 where it will be used for the next pixel, (m+1). The remaining three terms are applied through two shift registers, which operate as delay lines, to the adder 16. Register 15 delays the data by one cycle and register 13 delays the data by two cycles. These three error terms are then added in adder 16 and become available to the adder 17 as the sum of the 1/16, 3/16 and 5/16 error terms, to be used at the beginning of the next cycle as the (m−1) input.

In parallel with the above, the current cycle processes pixel m−2 of line n+1. At the beginning of this current cycle, the adder 17 for the next stage sums this combined [m−2] error term with the 7/16 term from the previous pixel and the eight bit input term from memory 20 to produce the error terms as was done in the upper half of the circuit. The difference here is that the sum of the three error terms output from the adder 22 is not used immediately, but is stored into memory 20. This is because lines n and n+1 are being processed at the same time, so the error terms from line n can be used immediately for n+1. However, the error terms for line n+2 will not be used until entire lines n and n+1 are completed. Therefore these error terms must be stored in memory until needed. It can now be seen that any number of lines can be processed in parallel, providing only that the combined error term for the first line of the set be supplied from memory, and that the output combined error terms from the last line be stored in memory.

Figure 3:
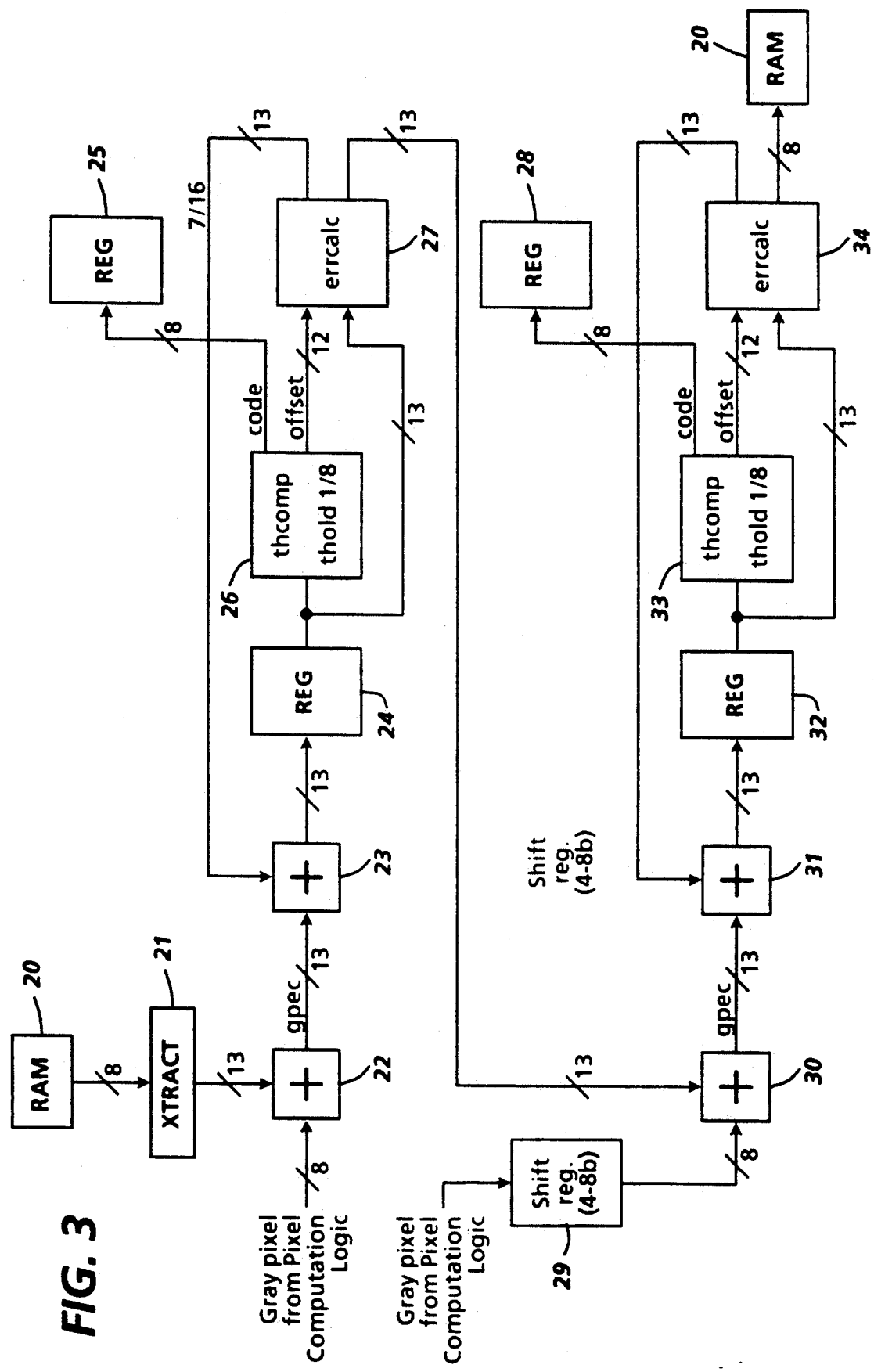
FIG. 3 is a more detailed block diagram of the two parallel circuits.

FIG. 3 is a more detailed block diagram of a two line processor. RAM 20 supplies two 8-bit words to the extractor 21 from which a 13-bit error term is supplied to the adder 22. Also supplied is the 8-bit input pixel. The resultant sum is added to the 7/16 term in adder 23 and the result is stored in register 24. This register has two outputs, one going to the error calculator, which will be discussed in more detail below, the other going to the threshold comaprator 26, which produces the output bit which is coupled to the output register 25 and the offset error term which is coupled to the error calculator 27. The 7/16 error term is coupled back to the adder 23 for the next pixel, and the sum of the remaining terms is applied to the adder 30 of the next line.

The next line operates exactly as the first except that the next line error terms are stored in memory 20.

Figure 4:
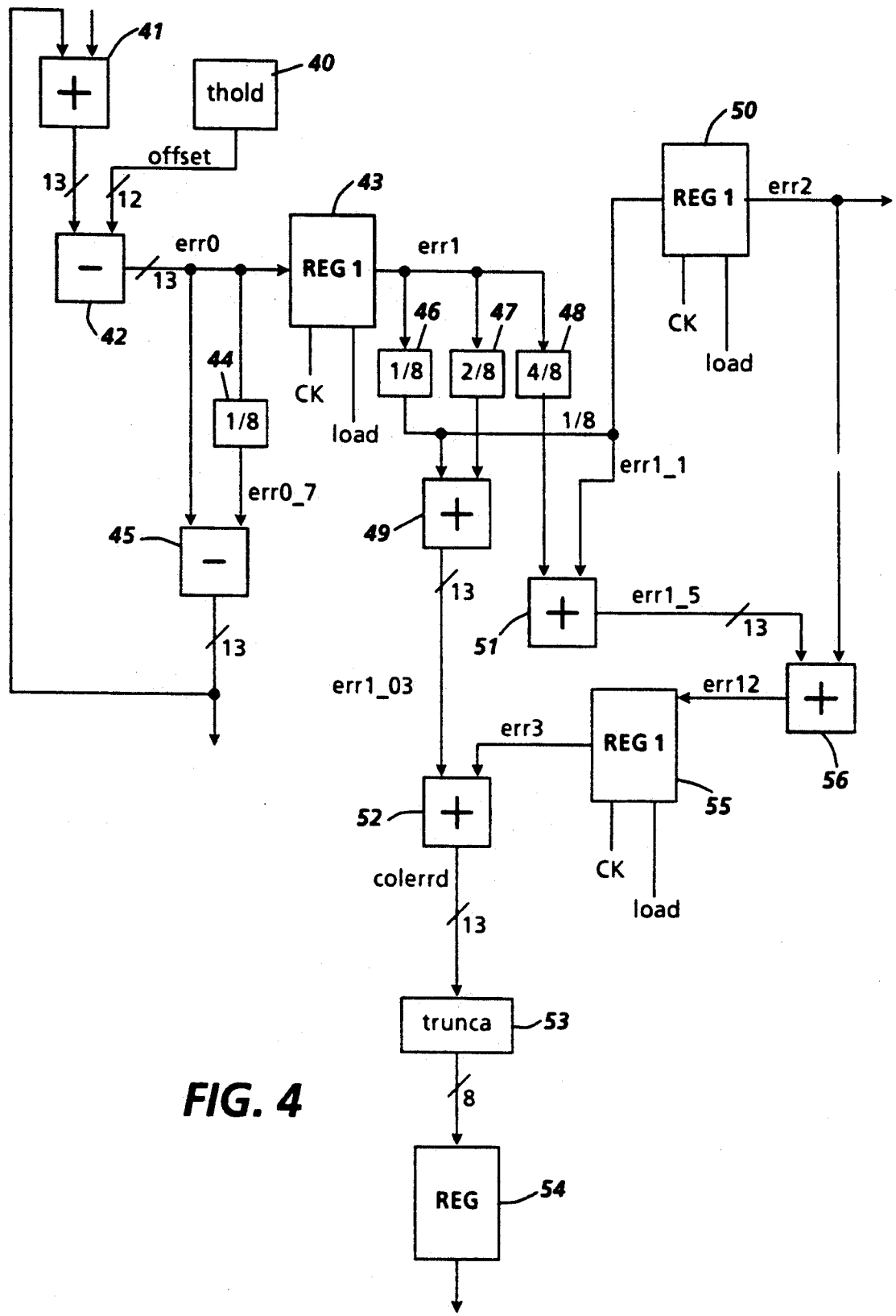
FIG. 4 is a detailed diagram of the error calculation circuit.

The error calculation is shown in more detail in FIG. 4. The subtractor 42 subtracts the threshold value stored in the threshold register 40 from the sum of the input pixel value, the 7/16 error term from subtractor 45 and the colerrm term from register 54. The result is the error term at the output of subtractor 42. Here, shifter 44 produces a ⅛ term which is subtracted from the error term, and the result is halved to produce the 7/16 term which is applied to the adder 41 for the next pixel computation.

This error term is also applied to register 43, the output of which is divided by 8, 4 and 2 in shifters 46, 47 and 48, respectively. These are used to produce ⅜ by adder 49, ⅝ by adder 51 and ⅛ by register 50. The ⅜ and ⅛ terms are added in adder 56 and the result is added to the ⅝ term in adder 52, which also shifts the result to create 1/16, 3/16 and 5/16 error terms. Finally the leading zeros are truncated by element 53 and the result is stored in register 54.

Notice that the ⅛ term is delayed one pixel cycle by register 55 and that the ⅛ term is delayed two pixel cycles by registers 50 and 55, which satisfies the timing requirement.

The circuit has been described in terms of reducing 8-bit pixels to 1-bit pixels, as would be done in a standard halftone process, but many other conversions which require error diffusion are possible using this technology. Any number of bits per input pixel can be used, including one bit per pixel, and the output can also be any number of bits per pixel. For example, the conversion of three bits per pixel in to eight bits per pixel out can also be handled by this system. In this case the thresholder would be replaced by a computational unit. Also, image enhancement that results in the same number of bits output as input can also be done. In short, any pixel processing that results in an error propagation can be accomplished at high speed using this invention.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

We claim:

1. A system for converting two or more input pixels in parallel during one cycle time into an equal number of output pixels by using one circuit for each pixel, the uppermost pixel being the m pixel of the n row of the image, the lowest pixel being the m−2x pixel of the n+x row, where x is an integer greater than zero, said converting comprising the conversion of input pixels at one number of bits to an output of pixels at a different number of bits, A. a circuit for processing said uppermost input pixel comprising:

a first adder for producing one output from a number of inputs, a memory for supplying said uppermost input pixel and a combined error term from the previous line as inputs to said first adder, means for converting said first adder output into the uppermost output pixel and a first, second, third and fourth error terms, and for supplying said first error term to said first adder as an input for the next cycle, a first means for delaying said third error term one cycle time, a second means for delaying said fourth error term two cycle times, and a second adder for producing a combined error term output for a number of second adder inputs comprising said second error term output from said means for converting and said delayed third and fourth error terms, and B. a circuit for processing said lowest pixel comprising:

a third adder for producing one output from a number of inputs, said inputs comprising the combined error term output of the next higher circuit, means for converting said third adder output into the lowest of said output pixels and a fifth, sixth, seventh and eighth error terms, and for supplying said fifth error term to said third adder as an input for the next cycle, a third means for delaying said seventh error term one cycle time, a fourth means for delaying said eighth error term two cycle times, a fourth adder for producing a combined error term output for a number of fourth adder inputs comprising said sixth error term output from said means for converting and said delayed seventh and eighth error terms, and a memory for supplying said lowest input pixel to said third adder as an input for the current cycle, and for storing the combined error term output of said fourth adder.

* * * * *